(12) United States Patent
Trainin et al.

(10) Patent No.: US 8,953,634 B2
(45) Date of Patent: Feb. 10, 2015

(54) DEVICE, SYSTEM AND METHOD OF COMMUNICATING DATA DURING AN ALLOCATED TIME PERIOD

(75) Inventors: Solomon B. Trainin, Haifa (IL); Michael Glik, Kfar Saba (IL); Elad Levy, Rishon LeZion (IL)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 13/602,353

(22) Filed: Sep. 4, 2012

(65) Prior Publication Data

US 2014/0064255 A1 Mar. 6, 2014

(51) Int. Cl.
*H04J 11/00* (2006.01)

(52) U.S. Cl.
USPC .......................... 370/445; 370/235; 370/236

(58) Field of Classification Search
USPC ........................................ 370/235, 236, 445
See application file for complete search history.

(56) References Cited

U.S. PATENT DOCUMENTS

| | | | | |
|---|---|---|---|---|
| 6,807,146 | B1 * | 10/2004 | McFarland | 370/208 |
| 2005/0105504 | A1 * | 5/2005 | Sakoda | 370/349 |
| 2005/0152324 | A1 | 7/2005 | Benveniste | |
| 2006/0050728 | A1 | 3/2006 | Sung et al. | |
| 2006/0164993 | A1 * | 7/2006 | Teague et al. | 370/235 |
| 2007/0115972 | A1 | 5/2007 | Jang et al. | |
| 2008/0056187 | A1 * | 3/2008 | Soong et al. | 370/330 |
| 2008/0112351 | A1 | 5/2008 | Surineni et al. | |
| 2009/0098899 | A1 * | 4/2009 | Gorokhov et al. | 455/522 |
| 2010/0157967 | A1 * | 6/2010 | Sakoda | 370/338 |
| 2012/0003986 | A1 * | 1/2012 | Gorokhov et al. | 455/452.2 |
| 2012/0033584 | A1 | 2/2012 | Corroy | |
| 2012/0230349 | A1 * | 9/2012 | Sakoda | 370/445 |
| 2013/0272272 | A1 * | 10/2013 | Sudak et al. | 370/336 |
| 2013/0329658 | A1 * | 12/2013 | Liu | 370/329 |

OTHER PUBLICATIONS

Wireless-Gigabit-Alliance (WGA) specifications (Wireless Gigabit Alliance, Inc WiGig MAC and PPY Specification Version 1.0, Final specification), Apr. 2010.
IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Jun. 12, 2007.
Universal Serial Bus Mass Storage Class—Bulk-Only Transport, Revision 1.0, Sep. 31, 1999; 22 pages.
International Search Report and Written Opinion for Patent Application No. PCT/US2013/047209, mailed on Oct. 1, 2013, 15 pages.

* cited by examiner

*Primary Examiner* — Jay P Patel
(74) *Attorney, Agent, or Firm* — Shichrur & Co.

(57) ABSTRACT

Some demonstrative embodiments include devices, systems and/or methods of communicating during an allocated time period. For example, an apparatus may include a wireless communication unit to perform the functionality of a first station to communicate data with a second station during an allocated time period, wherein, when both the first and second stations do not have data ready for transmission, the wireless communication unit is to communicate frames between the first station and the second station to occupy the allocated time period until at least one of the first and second stations has data ready for transmission or until an end of the allocated time period.

30 Claims, 6 Drawing Sheets

Fig. 2

DEVICE, SYSTEM AND METHOD OF COMMUNICATING DATA DURING AN ALLOCATED TIME PERIOD

BACKGROUND

In some wireless communication networks, a channel resource may be allocated for communication between first and second wireless communication devices during an allocated time period.

The allocated time period may include a contention based access period or a scheduled time period, e.g., in which the channel resource is pre-allocated for communication between the first and second wireless communication devices.

The wireless communication devices may maintain the allocated time period as long as at least one of the wireless communication devices has data ready for transmission. When both of the wireless communication devices do not have data ready for transmission, the wireless communication devices may release the allocated time period to enable another, different, wireless communication device to utilize the channel resource for communication.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
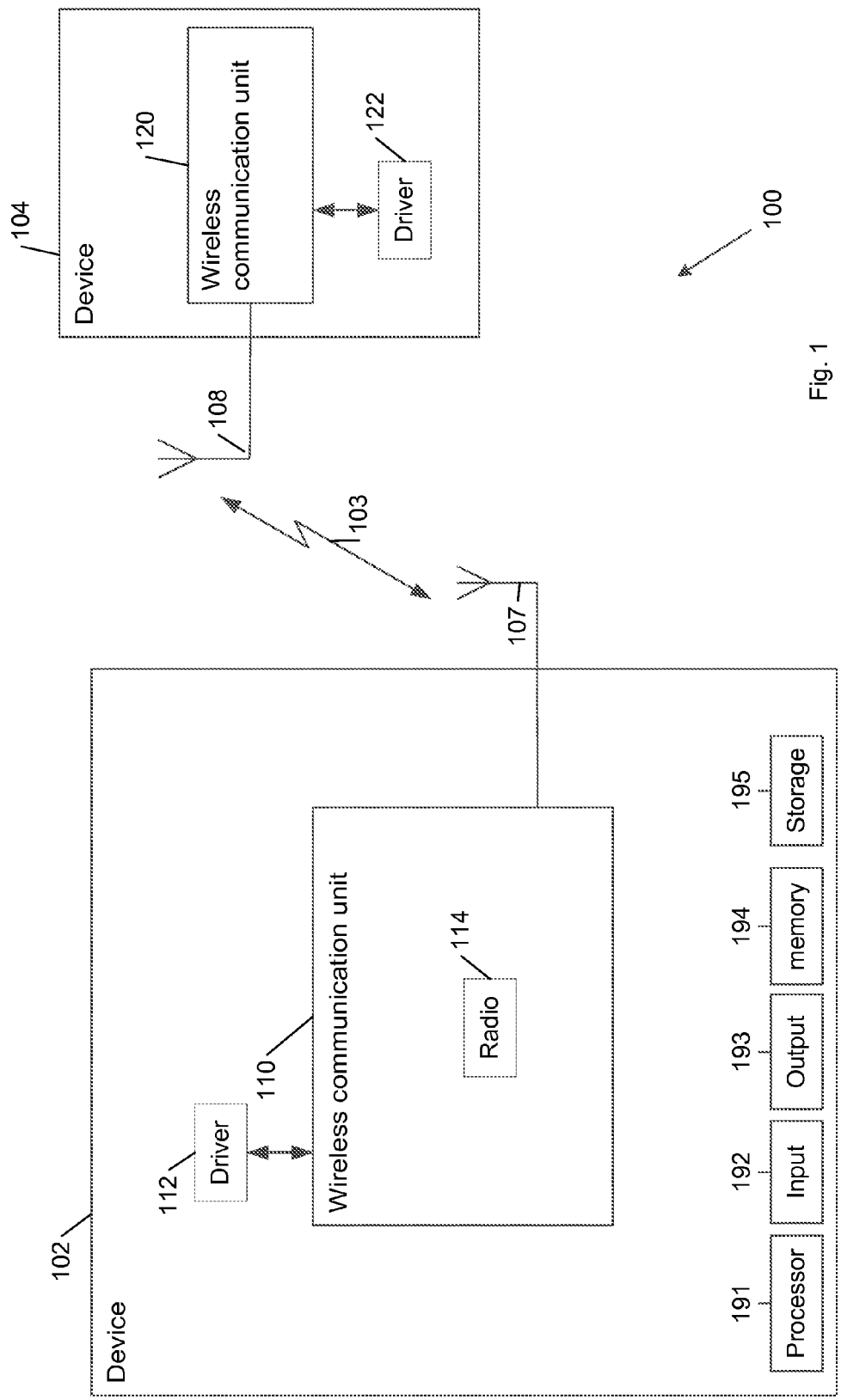
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing WiGig Serial Extension (WSE) protocols ("the WSE protocol") (WSE: WiGig serial extension WSE Draft Specification 1.02) and/or future versions and/or derivatives thereof, devices and/or networks operating in accordance with existing Bulk Only Transfer (BOT) Protocols ("the BOT protocol") (Universal Serial Bus (USB) Mass Storage Class Bulk-Only Transport, Revision 1.0, Sep. 31, 1999) and/or future versions and/or derivatives thereof, devices and/or networks operating in accordance with existing IEEE 802.11 standards (IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"); IEEE 802.11 task group ad (TGad) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "service period" (SP), as used herein, may relate to a contiguous time during which one or more individually addressed frames are transmitted to a STA, e.g. a quality of service (QoS) STA, and/or one or more transmission opportunities (TxOPs) are granted to the same STA.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

The phrase "Transmit Opportunity (TxOP)", as used herein may relate to an interval of time when a particular STA, e.g., a QoS STA, has the right to initiate frame exchange sequences onto the WM. A TxOP may be defined, for example, by a starting time and a maximum duration and/or any other parameters. In one example, the TxOP may be obtained by the STA by successfully contending for the channel or assigned by a coordinator.

Reference is now made to FIG. 1, which schematically illustrates a block diagram of a system 100, in accordance with some demonstrative embodiments.

In some demonstrative embodiments, system 100 may include one or more devices, e.g., devices 102 and 104, capable of communicating content, data, information and/or signals over a wireless communication medium 103. For example, device 104 may include a wireless communication unit 120, and device 102 may include a wireless communication unit 110.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication medium 103 may include, for example, a radio channel, an IR channel, a RF channel, a Wireless Fidelity (WiFi) channel, and the like. In one example, the wireless communication medium may include a DMG channel, e.g., a 60 GHz channel.

In some demonstrative embodiments, wireless communication units 110 and 120 may include, or may be associated with, one or more antennas 107 and 108, respectively. Antennas 107 and 108 may include any type of antennas suitable for transmitting and/or receiving wireless communication signals, blocks, frames, transmission streams, packets, messages and/or data. For example, antennas 107 and 108 may include any suitable configuration, structure and/or arrangement of one or more antenna elements, components, units, assemblies and/or arrays. Antennas 107 and 108 may include, for example, antennas suitable for directional communication, e.g., using beamforming techniques. For example, antennas 107 and 108 may include a phased array antenna, a single element antenna, a set of switched beam antennas, and/or the like. In some embodiments, antennas 107 and 108 may implement transmit and receive functionalities using separate transmit and receive antenna elements. In some embodiments, antennas 107 and 108 may implement transmit and receive functionalities using common and/or integrated transmit/receive elements.

In some demonstrative embodiments, wireless communication units 110 and/or 120 may include, for example, one or more radios 114, e.g., including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication devices 102 and/or 104 may perform the functionality of at least one DMG STA. For example, wireless communication devices 102, and/or 104 may be configured to communicate over the DMG band.

In some demonstrative embodiments, wireless communication devices 102 and 104 may be configured to communicate data over wireless communication medium 103.

In some demonstrative embodiments, device 102 may include a driver 112 configured to process data communicated with device 104. For example, driver 112 may prepare and provide data to be transmitted by device 102 to device 104, and/or driver 112 may process data received by device 102 from device 104.

In some demonstrative embodiments, device 104 may include a driver 122 configured to process data communicated with device 102. For example, driver 122 may prepare and provide data to be transmitted by device 104 to device 102, and/or driver 122 may process data received by device 104 from device 102.

In some demonstrative embodiments, wireless communication devices 102 and 104 may communicate the data according to the WSE protocol, the BOT protocol and/or any other protocol.

In one example, device 102 may include a computing device, e.g., a laptop, an Ultrabook™, a netbook, and the like; and/or device 104 may include a mass storage device, e.g., a USB mass storage (UMS) device, a hard drive, an optical drive, a flash memory device, and the like. Drivers 112 and/or 122 may include, for example, a driver configured according to the WSE and/or BOT protocols.

In some demonstrative embodiments, devices 102 and 104 may be configured to perform at least one transaction over wireless communication medium 103. The transaction may include a sequence of transmissions communicated and/or exchanged between devices 102 and 104 over wireless communication medium 103. For example, devices 102 and 104 may be configured to perform a read transaction, a write transaction and/or any other transaction, e.g., according to the WSE and/or the BOT protocols, and/or any other protocol.

In one example, the transaction may include a request transmission, a response transmission, one or more data transfer transmissions, one or more acknowledge (ACK) transmissions, and the like.

In some demonstrative embodiments, devices 102 and 104 may be configured to perform the transaction during at least one allocated time period.

In some demonstrative embodiments, the at least one allocated time period may include at least one scheduled time period and/or at least one contention-based period. For example, devices 102 and/or 104 may be configured to gain access to wireless communication medium 103 during a scheduled time period and/or during a contention-based period. For example, the allocated time period may include a TxOP.

In some demonstrative embodiments, wireless communication units 110 and/or 120 may be required to regain access to wireless medium 103 to transmit one or more transmissions of the transaction, for example, if the allocated time period is not available when the transmission is ready to be transmitted, e.g., if wireless communication units 110 and/or 120 do not maintain the allocated time period until the transmission is ready to be transmitted.

In some demonstrative embodiments, wireless communication units 110 and/or 120 may be required to regain access to wireless medium 103, for example, if an inter frame space (IFS) between the transmissions of the transaction is longer than a predefined IFS period, e.g., a short-inter-frame-space (SIFS) time period.

In some demonstrative embodiments, the IFS between the transmissions of the transaction may be longer than the predefined IFS, for example, due to a delay in receiving the data from drivers 112 and/or 122 at wireless communication units 110 and/or 120.

In one example, wireless communication unit 110 may transmit a transaction request transmission to device 104, wireless communication unit 120 may receive the request transmission, and driver 122 may process the request and prepare data to be transmitted to device 102. Processing the request may take a time period longer than the SIFS. Accordingly, wireless communication unit 120 may not have data ready for transmission, when the SIFS ends. Therefore, another wireless communication device may be able to utilize wireless communication medium 103, e.g., if wireless communication units 110 and/or 120 do not transmit any transmissions after the SIFS.

In some demonstrative embodiments, the IFS between one or more transmissions, e.g., each of the transmissions, of the transaction may be longer than the predefined IFS period, e.g., due to the delay in receiving the data from drives 112 and/or 122.

Accordingly, wireless communication units 110 and/or 120 may be required to regain access to wireless medium 103 for one or more, e.g., each one, of the transmissions, if devices 102 and/or 104 do not maintain the allocated time period, for example, until the transmissions are ready to be transmitted.

In some demonstrative embodiments, regaining access to wireless communication medium 103 may require a relatively long period of time.

In one example, if the allocated time period is a contention-based period wireless communication units 110 and/or 120 may have to wait a relatively long period of time until wireless communication medium 103 may be available, e.g., if wireless communication medium 103 is congested.

In another example, if the allocated time period is a scheduled time period, wireless communication units 110 and/or 120 may be required to wait for a next scheduled time period.

In some demonstrative embodiments, a relatively long time period may be required to complete the transaction, e.g., if wireless communication units 110 and/or 120 may be required to regain access to wireless medium 103 a relatively large number of times. For example, the transaction may include a plurality of transmissions such that, for each one of the transmissions, wireless communication units 110 and/or 120 may be required to regain access to wireless medium 103, e.g., if wireless communication units 110 and/or 120 do not maintain the allocated time period between the transmissions.

In some demonstrative embodiments, wireless communication units 110 and/or 120 may maintain the allocated time period, for example, even when wireless communication units 110 and/or 120 do not have data ready for transmission, e.g., as described in details below.

In one example, wireless communication units 110 and/or 120 may maintain the allocated time period, for example, even when wireless communication units 110 and/or 120 do not have data ready for transmission, e.g., if it assumed that wireless communication unit 110 may receive from driver 112 data for communication and/or wireless communication unit 120 may receive from driver 122 data for communication, before the end of the allocated time period.

In some demonstrative embodiments, wireless communication units 110 and/or 120 may communicate data between a source station and a destination station during the allocated time period.

In some demonstrative embodiments, wireless communication unit 110 may perform the functionality of at least one first station, e.g., at least one first DMG station, and/or wireless communication unit 120 may perform the functionality of at least one second station, e.g., at least one second DMG station.

In some demonstrative embodiments, wireless communication unit 110 may perform the functionality of the source station, and wireless communication unit 120 may perform the functionality of the destination station. For example, wireless communication unit 110 may include a source STA and wireless communication unit 120 may include a destination or a responder STA. Accordingly, wireless communication unit 110 may initiate the communication, may gain access to wireless communication medium 103 and may request to communicate data with wireless communication unit 120 during the allocated time period.

In some demonstrative embodiments, when both the source station and the destination station do not have data ready for transmission, wireless communication units 110 and/or 120 may communicate frames between the source station and the destination station to occupy the allocated time period, for example, until at least one of the source station and the destination station have data ready for transmission, or until an end of the allocated time period.

In some demonstrative embodiments, wireless communication units 110 and/or 120 may communicate the frames by communicating a polling sequence including a poll frame transmitted from the source station to the destination station, and a service period request (SPR) frame transmitted from the destination station to the source station, in response to the poll frame. For example, wireless communication unit 110 may transmit the poll frame to wireless communication unit 120, and wireless communication unit 120 may transmit the SPR frame to wireless communication unit 110, in response to the poll frame, e.g., as described below with reference to FIG. 2.

In some demonstrative embodiments, wireless communication units 110 and/or 120 may repeat communication of the polling sequence, e.g., if the SPR frame does not indicate that the destination station has data ready for transmission. For example, if the SPR frame does not indicate that wireless communication unit 120 has data ready for transmission, e.g., due to delay in driver 122, wireless communication unit 110 may repeat transmitting of the poll frame to wireless communication unit 120, and wireless communication unit 120 may repeat transmitting the SPR frame to wireless communication unit 110, in response to the poll frame, e.g., as described below with reference to FIG. 2.

In some demonstrative embodiments, wireless communication units 110 and/or 120 may repeat communication of the polling sequence, for example, until at least one of the source station and destination station have data ready for transmission, or until the end of the allocated time period. For example, wireless communication unit 110 may repeat transmitting of the poll frame to wireless communication unit 120, and wireless communication unit 120 may repeat transmitting the SPR frame to wireless communication unit 110, in response to the poll frame, until at least one of wireless communication units 110 and 120 have data ready for transmission, or until the end of the allocated time period, e.g., as described below with reference to FIG. 2.

In some demonstrative embodiments, wireless communication unit 110 may communicate a grant frame from the source station to the destination station in response to the SPR frame, for example, if the SPR frame indicates that the destination station has data ready for transmission. For example, wireless communication unit 110 may transmit a grant frame to wireless communication unit 120 in response to the SPR frame, for example, if the SPR frame indicates that wireless communication unit 120 has data ready for transmission, e.g., provided by driver 122. Wireless communication unit 120 may receive the grant frame and may transmit the data to wireless communication unit 110, e.g., as described below with reference to FIG. 2.

In some demonstrative embodiments, wireless communication units 110 and/or 120 may communicate the frames by repeatedly communicating a null frame from the source station to the destination station, for example, until at least one of the source station and destination station have data ready for transmission or until the end of the allocated time period. For example, wireless communication unit 110 may repeatedly transmit a null frame to wireless communication unit 120, for example, until at least one of wireless communication units 110 and/or 120 may have data ready for transmission or until the end of the allocated time period, e.g., as described below with reference to FIG. 3.

In some demonstrative embodiments, the null frame may have a reverse direction grant (RDG) indicator set to allow the destination station to transmit data. For example, the null frame may have the RDG indicator set to allow wireless communication unit 120 to transmit data, e.g., as described below with reference to FIG. 3.

In some demonstrative embodiments, the IFS between the communicated frames may not be longer than a SIFS. For example, wireless communication unit 110 may transmit the poll frame and wireless communication unit 120 may transmit the SPR frame, in response to the poll frame, such that the IFS, e.g., between the poll and the SPR frame, is not longer than the SIFS.

In some demonstrative embodiments, wireless communication units 110 and/or 120 may utilize any other method to occupy the allocated time period by communicating frames between the source station and the destination station, e.g., any other polling mechanism and the like.

In some demonstrative embodiments, the data may include data to be communicated according to a predefined protocol, e.g., the WSE protocol, the BOT protocol, and the like.

In some demonstrative embodiments, wireless communication units 110 and/or 120 may communicate a truncation frame to truncate the allocated time period, for example, if according to the protocol both the source station and destination station may not be allowed to and/or may not be expected to transmit additional data during the allocated time period.

In one example, wireless communication units 110 and 120 may communicate according to the WSE protocol, and wireless communication unit 110 may transmit a truncation frame to truncate the allocated time period, if, for example, according to the WSE protocol, both wireless communication units 110 and/or 120 may not transmit additional data during the allocated time period.

In some demonstrative embodiments, wireless communication units 110 and/or 120 may selectively maintain the allocated time period, e.g., even when there is no data ready for transmission, according, for example, to an explicit request, for example, from driver 112 and/or driver 122, e.g., to reduce a power consumption of devices 102 and/or 104. For example, wireless communication units 110 and/or 120 may not occupy the maintain time period, e.g., if an explicit request is not received from drivers 112 and/or 122.

In some demonstrative embodiments, wireless communication units 110 and/or 120 may reduce an access delay, may increase a network throughout and/or performance of devices 102 and/or 104, for example, by occupying and/or maintaining the allocated time period.

For example, wireless communication units 110 and/or 120 may be able to communicate two or more, e.g., most or all, of the transmissions of the transaction during the allocated time period, for example, by maintaining the allocated time period, even when there is no data ready for transmission.

Wireless communication devices 102 and/or 104 may also include, for example, one or more of a processor 191, an input unit 192, an output unit 193, memory unit 194, and storage unit 195. Wireless communication device 102 and/or may optionally include other suitable hardware components and/or software components. In some demonstrative embodiments, some or all of the components of wireless communication device 102 and/or 104 may be enclosed in a common housing or packaging, and may be interconnected or operably associated using one or more wired or wireless links. In other embodiments, components of one or more of wireless communication device 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102, and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102 and/or 104.

Figure 2:
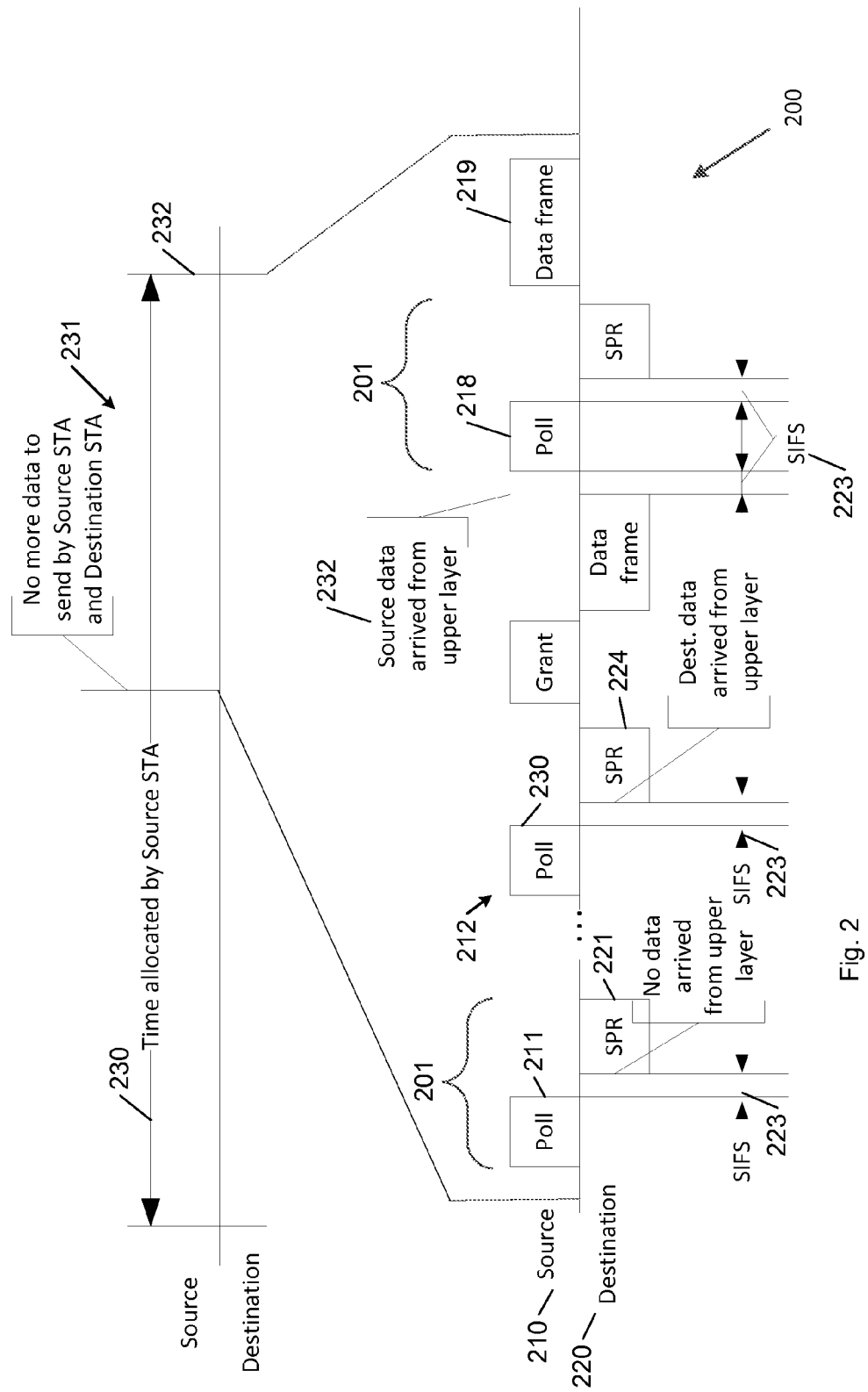
FIG. 2 is a schematic illustration of a sequence of frames communicated between a source station and a destination station during an allocated time period, in accordance with some demonstrative embodiments.

Reference is now made to FIG. 2, which schematically illustrates a sequence 200 of frames communicated between a source station 210 and a destination station 220 during an allocated time period 230, in accordance with some demonstrative embodiments. In some demonstrative embodiments, wireless communication units 110 (FIG. 1) and/or 120 (FIG. 1) may perform the functionality of source station 210 and/or destination station 220.

As shown in FIG. 2, source station 210 and destination station 220 may communicate a poling sequence 201 to occupy allocated time period 230, e.g., during a period 231, when both source station 210 and destination station 220 do not have data ready for transmission.

As shown in FIG. 2, polling sequence 201 may include a poll frame 211 transmitted from source station 210 to destination station 220, and an SPR frame 221 transmitted from destination station 220 to source station 210, in response to poll frame 211.

As shown in FIG. 2, source station 210 and destination station 220 may repeat communicating poll sequence 201, as long as source station 210 and destination station 220 do not have data ready for transmission, e.g., while SPR frame 221 indicates that destination station 220 does not have data ready for transmission.

As shown in FIG. 2, source station 210 and destination station 220 may repeat communicating poll sequence 201 until at least one of source station 210 and destination station 220 have data ready for transmission, or until an end 232 of allocated time period 230.

As shown in FIG. 2, destination station 220 may transmit an SPR frame 224 indicating that destination station 220 has data ready for transmission.

As shown in FIG. 2, source station 210 may transmit to destination station 220 a grant frame 213, e.g., in response to SPR frame 224, and destination station 220 may transmit to source station 220 a data frame, e.g., in response to grant frame 213.

As shown in FIG. 2., source station 210 and destination station 220 may repeat communicating poll sequence 201 to continue to occupy allocated time period 230, for example, until source station 210 has data ready for transmission. Source station 210 may transmit to destination station 220 a data frame 219, e.g., to complete the data transmission between source station 210 and destination station 220.

As shown in FIG. 2, an IFS between the frames, e.g., of sequence 200, may not be longer than a SIFS 223.

Figure 3:
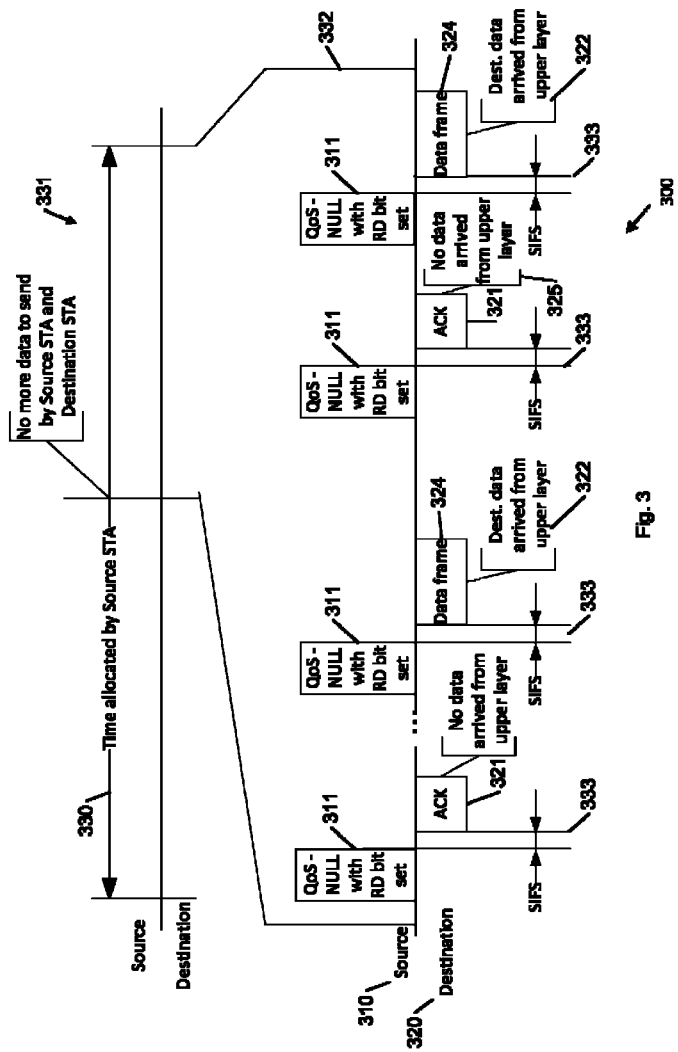
FIG. 3 is a schematic illustration of another sequence of frames communicated between a source station and a destination station during an allocated time period, in accordance with some demonstrative embodiments.

Reference is now made to FIG. 3, which schematically illustrates a sequence 300 of frames communicated between a source station 310 and a destination station 320 during an allocated time period 330, in accordance with some demonstrative embodiments. In some demonstrative embodiments, source station 310 and destination station 320 may perform the functionality of wireless communication unit 110 (FIG. 1) and/or 120 (FIG. 1).

As shown in FIG. 3, source station 310 may repeatedly transmit to destination station 320 a null frame 311 to occupy allocated time period 330, e.g., during a time period 331 when both source station 310 and destination station 320 do not data ready for transmission, for example, until at least one of source station 310 and destination station 320 have data ready for transmission or until an end 332 of allocated time period 330.

In some demonstrative embodiments, null frame 311 may include a RDG indicator set to allow destination station 320 to transmit data. For example, null frame 311 may include a quality of service (QoS) Null frame with a RDG bit value set, for example, to one.

As shown in FIG. 3, destination station 320 may respond to frame 311 with an acknowledge (ACK) frame 321 indicating that destination station 320 does not have data ready for transmission (325), or indicating that destination station 320 has data ready for transmission (322).

As shown in FIG. 3, destination station 320 may transmit to source station 310 a data frame 324, e.g., when destination station 320 has data ready for transmission (322).

As shown in FIG. 3, an IFS between the frames, e.g., of sequence 300, may not be longer than a SIFS 333.

Figure 4:
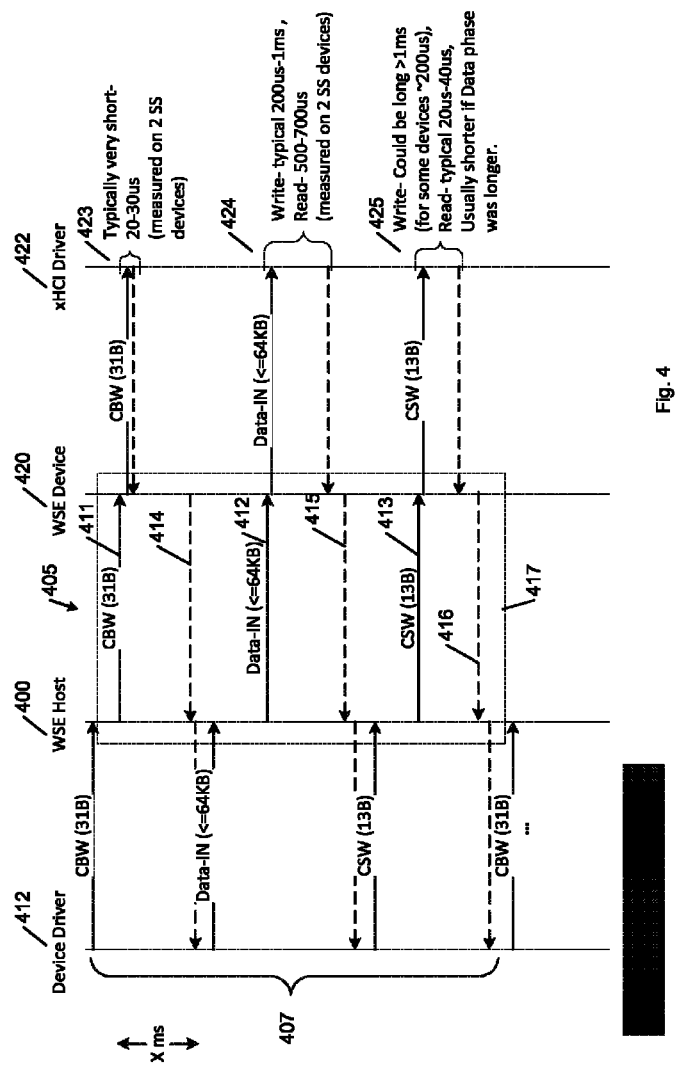
FIG. 4 is a schematic illustration of a sequence diagram of communicating data between a source station and a destination station, in accordance with some demonstrative embodiments.

Reference is now made to FIG. 4, which schematically illustrates a sequence diagram of communicating data between a source station 400 (WSE host) having a device driver 412, and a destination station 420 having a driver 422 (xHCI driver) over a wireless communication medium 405, in accordance with some demonstrative embodiments. In some demonstrative embodiments, source station 400 and destination station 420 may perform the functionality of wireless communication units 110 (FIG. 1) and/or 120 (FIG. 1), device driver 412 may perform the functionality of driver 112 (FIG. 1) and/or driver 422 may perform the functionality of driver 122 (FIG. 1).

As shown in FIG. 4, source station 400 and destination station 420 may perform a write transaction 407 according to the BOT protocol.

As shown in FIG. 4, write transaction 407 may include communicating a sequence of transmissions over wireless communication medium 405, e.g., a command block wrapper (CBW) frame 411, a Data-In frame 412, a command status wrapper (CSW) frame 413, and three responses 414, 415 and 416, e.g., a response for each one of the frames 411, 412 and 413, respectively.

As shown in FIG. 4, driver 422 may have one or more delays in processing the data received from source station 400. For example, a first delay 423, when receiving CBW frame 411; a second delay 424, when writing the data received in Data-In frame 412; and a third delay 425 when receiving CSW frame 413.

As shown in FIG. 4, the sequence of transmissions of transaction 407 may be completed during a single allocated time period 417, such that write transaction 407 is completed during allocated time period 417. For example, source station 400 may occupy allocated time period 417 during delays 423, 242 and 425, for example, by communicating frames with destination station 420 to maintain an IFS between which is not longer than SIFS, e.g., as described above.

In some demonstrative embodiments, source station 400 and destination station 420 may be required to regain access to wireless communication medium 405 for one or more, e.g., each, transmissions of the transmissions of the sequence, for example, if source station 400 and destination station 420 do not occupy allocated time period 417 during delays 423, 424 and 425. As a result, a substantially longer period of time may be required to complete transaction, e.g., if source station 400 and destination station 420 do not occupy allocated time period 417 during delays 423, 424 and 425.

Figure 5:
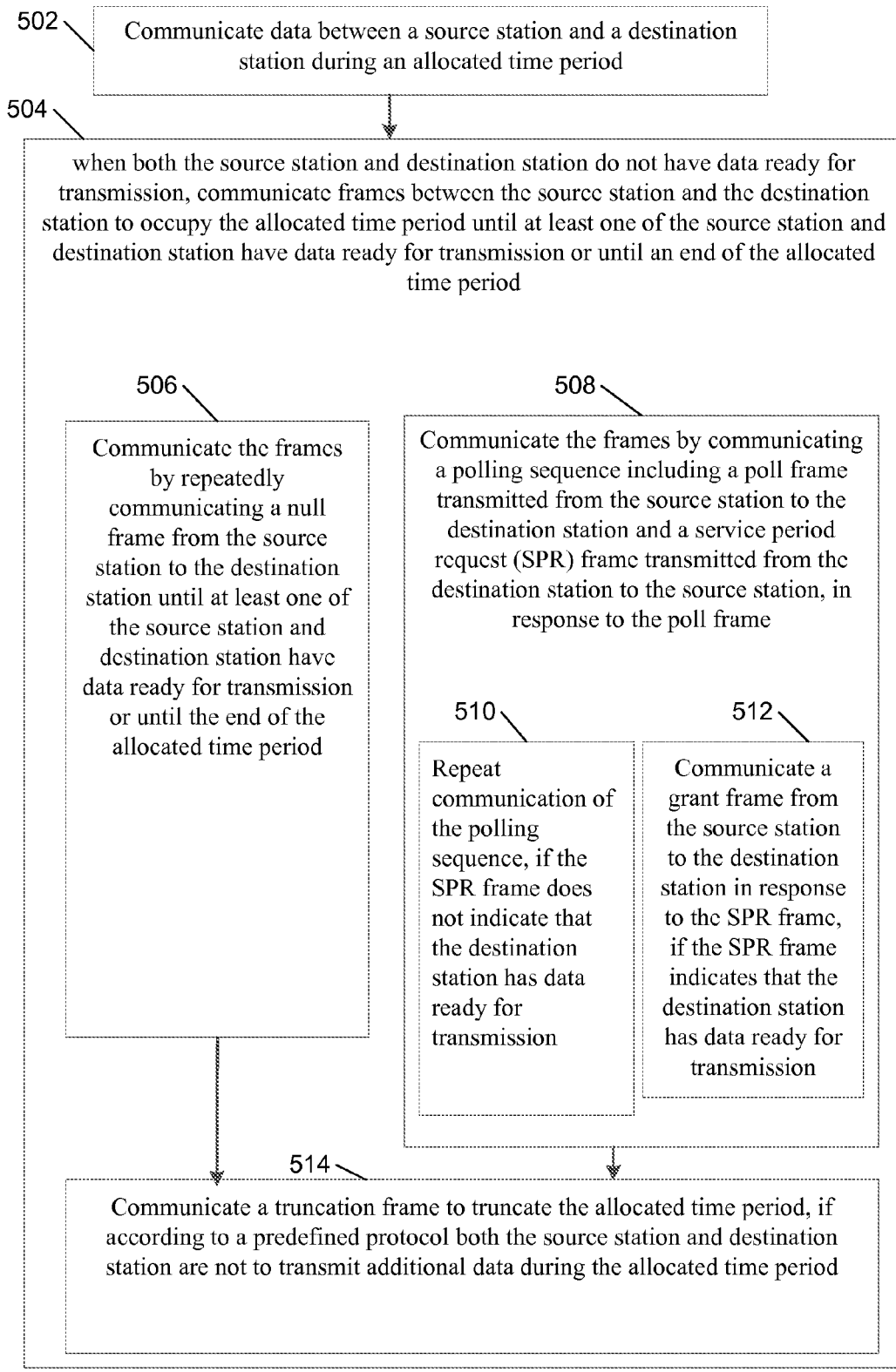
FIG. 5 is a schematic flow-chart illustration of a method of communicating data during an allocated time period, in accordance with some demonstrative embodiments.

Reference is made to FIG. 5, which schematically illustrates a method of communicating data during an allocated time period, in accordance with some demonstrative embodiments. In some embodiments, one or more of the operations of the method of FIG. 5 may be performed by a wireless communication system, e.g., system 100 (FIG. 1); a wireless communication device, e.g., devices 102 and/or 104 (FIG. 1); and/or a wireless communication unit, e.g., wireless communication units 110, and/or 120 (FIG. 1).

As indicated at block 502, the method may include communicating data between a source station and a destination station during an allocated time period. For example, wireless communication unit 110 (FIG. 1) may communicate data with wireless communication unit 120 (FIG. 1) during the allocated time period, e.g., as described above.

As indicated at block 504, the method may include, when both wireless communication units 110 and 102 do not have data ready for transmission, communicating frames between the source station and the destination station to occupy the allocated time period until at least one of the source station and destination station have data ready for transmission or until an end of the allocated time period, when both the source station and destination station do not have data ready for transmission. For example, wireless communication unit 110 (FIG. 1) may communicate frames with wireless communication unit 120 (FIG. 1) to occupy the allocated time period until at least one of wireless communication units 110 and/or 120 (FIG. 1) have data ready for transmission or until the end of the allocated time period, e.g., as described above.

As indicated at block 506, communicating the frames between the source station and the destination station may include communicating the frames by repeatedly communicating a null frame from the source station to the destination station, for example, until at least one of the source station and destination station have data ready for transmission or until the end of the allocated time period.

In some demonstrative embodiments, the null frame may have an RDG indicator set to allow the destination station to transmit data. For example, source station 310 (FIG. 3) may communicate frames with destination station 320 (FIG. 3) by repeatedly transmitting null frame 311 to destination station 320 (FIG. 3) until at least one of source station 310 (FIG. 3) and destination station 320 (FIG. 3) have data ready for transmission 322 (FIG. 3), or until the end of allocated time period 332 (FIG. 3). Null frame 311 (FIG. 3) may include an RDG indicator set to allow destination station 320 (FIG. 3) to transmit data, e.g., as described above.

As indicated at block 508, communicating the frames between the source station and the destination station may include communicating the frames by communicating a polling sequence including a poll frame transmitted from the source station to the destination station and a SPR frame transmitted from the destination station to the source station, in response to the poll frame. For example, source station 210 (FIG. 2) and destination station 220 (FIG. 2) may communicate polling sequence 201 (FIG. 2) including poll frame 211 (FIG. 2) transmitted from source station 210 (FIG. 2) to destination station 220 (FIG. 2), and SPR frame 221 transmitted from destination station 220 (FIG. 2) to source station 210 (FIG. 2), in response to poll frame 221 (FIG. 2), e.g., as described above.

As indicated at block 510, communicating the frames by communicating the polling sequence may include repeating the communication of the polling sequence, if the SPR frame does not indicate that the destination station has data ready for transmission. For example, source station 210 (FIG. 2) may repeat communicating of poling sequence 201 (FIG. 2), e.g., if SPR frame 221 (FIG. 2) does not indicate that destination station 220 (FIG. 2) has data ready for transmission 222 (FIG. 2), e.g., as described above.

As indicated at block 512, communicating the frames by communicating the polling sequence may include communicating a grant frame from the source station to the destination station in response to the SPR frame, if the SPR frame indicates that the destination station has data ready for transmission. For example, source station 210 (FIG. 2) may transmit grant frame 213 (FIG. 2) to destination station 220 (FIG. 2) in response to SPR frame 224 (FIG. 2), if SPR frame 224 (FIG. 2) indicates that destination station 220 (FIG. 2) has data ready for transmission, e.g., as described above.

As indicated at block 514, communicating the frames between the source station and the destination station may include communicating a truncation frame to truncate the allocated time period, if according to a predefined protocol both the source station and destination station are not to transmit additional data during the allocated time period. For example, wireless communication unit 110 (FIG. 1) may transmit the truncation frame to truncate the allocated time period, if according to the predefined protocol utilized by wireless communication units 110 and/or 120, both wireless communication units 110 and 120 (FIG. 1) are not to transmit additional data during the allocated time period, e.g., as described above.

Figure 6:
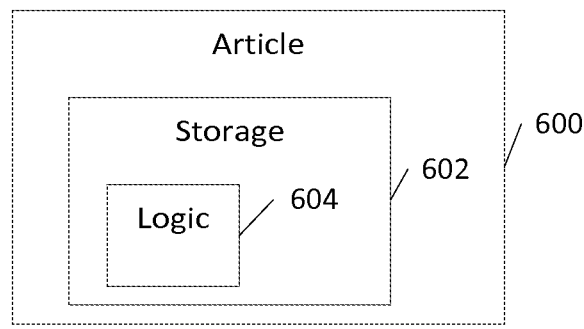
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a non-transitory machine-readable storage medium 602 to store logic 604, which may be used, for example, to perform at least part of the functionality of device 102 (FIG. 1), device 104 (FIG. 1), wireless communication unit 110 (FIG. 1), wireless communication unit 120 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some demonstrative embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication unit including:
a transmitter; and
a receiver,
the wireless communication unit configured to perform the functionality of a first station to communicate data with a second station during an allocated time period, wherein one station of said first and second stations comprises a source station and another station of said first and second stations comprises a destination station, wherein, when data is not ready for transmission between said first and second stations, said wireless communication unit is to communicate a polling sequence with said second station, the polling sequence to occupy said allocated time period until data is ready for transmission between said first and second stations or until an end of said allocated time period, the polling sequence including a poll frame from said source station to said destination station, and a service period request (SPR) frame from said destination station to said source station, the SPR frame being in response to said poll frame.

2. The apparatus of claim 1, wherein said allocated time period comprises a time period selected from the group consisting of a scheduled time period and a contention-based period.

3. The apparatus of claim 1, wherein if said SPR frame does not indicate that said destination station has data ready for transmission, said wireless communication unit is to repeat communication of said polling sequence.

4. The apparatus of claim 3, wherein said wireless communication unit is to repeat communication of said polling sequence until data is ready for transmission between said first and second stations or until the end of said allocated time period.

5. The apparatus of claim 1, wherein, if said SPR frame indicates that said destination station has data ready for transmission, said wireless communication unit is to communicate a grant frame, the grant frame from said source station to said destination station in response to said SPR frame.

6. An apparatus comprising:
a wireless communication unit including:
a transmitter; and
a receiver,
the wireless communication unit configured to perform the functionality of a first station to communicate data with a second station during an allocated time period, wherein one station of said first and second stations comprises a source station and another station of said first and second stations comprises a destination station, wherein, when data is not ready for transmission between said first and second stations, said wireless communication unit is to repeatedly communicate a null frame from said source station to said destination station until data is ready for transmission between said source station and said destination station or until the end of said allocated time period, the null frame including a quality of service (QoS) Null frame having a reverse direction grant (RDG) indicator bit set to a value configured to allow said destination station to transmit data.

7. An apparatus comprising:
a wireless communication unit including:
a transmitter; and
a receiver,
the wireless communication unit configured to perform the functionality of a first station to communicate data with a second station during an allocated time period, wherein, when data is not ready for transmission between said first and second stations, said wireless communication unit is to communicate frames with said second station to occupy said allocated time period until data is ready for transmission between said first and second stations or until an end of said allocated time period,
wherein said data comprises data to be communicated according to a predefined protocol, and wherein said wireless communication unit is to communicate a truncation frame to truncate said allocated time period, if according to said protocol both said first and second stations are not to transmit additional data during said allocated time period.

8. The apparatus of claim 6, wherein an inter-frame-space (IFS) between successive null frames is not longer than a short-inter-frame-space (SIFS).

9. The apparatus of claim 6, wherein said allocated time period comprises a time period selected from the group consisting of a scheduled time period and a contention-based period.

10. The apparatus of claim 1, wherein said data comprises data to be communicated according to a wireless serial extension (WSE) protocol, or a Bulk only Transport (BOT) protocol.

11. The apparatus of claim 7, wherein said data comprises data to be communicated according to a Bulk only Transport (BOT) protocol, or a wireless serial extension (WSE) protocol.

12. A method to be performed by a source station or a destination station, the method comprising:
communicating data between the source station and the destination station during an allocated time period; and
when data is not ready for transmission between said source station and said destination station, communicating a polling sequence between said source station and said destination station to occupy said allocated time period until data is ready for transmission between said source station and said destination station or until an end of said allocated time period, the polling sequence including a poll frame from said source station to said destination station, and a service period request (SPR) frame from said destination station to said source station, the SPR frame in response to said poll frame.

13. The method of claim 12 comprising repeating the communicating of said polling sequence, if said SPR frame does not indicate that said destination station has data ready for transmission.

14. The method of claim 12 comprising repeating the communicating of said polling sequence until data is ready for transmission between said source station and said destination station or until the end of said allocated time period.

15. The method of claim 12 comprising communicating a grant frame from said source station to said destination station in response to said SPR frame, if said SPR frame indicates that said destination station has data ready for transmission.

16. A method to be performed by a source station or a destination station, the method comprising:
communicating data between the source station and the destination station during an allocated time period; and
when data is not ready for transmission between said source station and said destination station, repeatedly communicating a null frame from said source station to said destination station to occupy said allocated time period until data is ready for transmission between said source station and said destination station or until an end of said allocated time period, the null frame including a quality of service (QoS) Null frame having a reverse direction grant (RDG) indicator bit set to a value configured to allow said destination station to transmit data.

17. The method of claim 16, wherein an inter-frame-space (IFS) between successive null frames is not longer than a short-inter-frame-space (SIFS).

18. A method to be performed by a source station or a destination station, the method comprising:
communicating data between the source station and the destination station during an allocated time period;
when data is not ready for transmission between said source station and said destination station, communicating frames between said source station and said destination station to occupy said allocated time period until data is ready for transmission between said source station and said destination station or until an end of said allocated time period; and
communicating a truncation frame to truncate said allocated time period, if according to a predefined protocol of communicating said data, both said source station and destination station are not to transmit additional data during said allocated time period.

19. The method of claim 18, wherein said data comprises data to be communicated according to a Bulk only Transport (BOT) protocol, or a wireless serial extension (WSE) protocol.

20. A system comprising:
at least one wireless communication device including:
one or more antennas; and
a wireless communication unit to perform the functionality of a first station to communicate data with a second station during an allocated time period, wherein one station of said first and second stations comprises a source station and another station of said first and second stations comprises a destination station, wherein, when data is not ready for transmission between said first and second stations, said wireless communication unit is to communicate a polling sequence with said second station, the polling sequence to occupy said allocated time period until data is ready for transmission between said first and second stations or until an end of said allocated time period, the polling sequence including a poll frame from said source station to said destination station, and a service period request (SPR) frame from said destination station to said source station, the SPR frame being in response to said poll frame.

21. The system of claim 20, wherein if said SPR frame does not indicate that said destination station has data ready for transmission, said wireless communication unit is to repeat communication of said polling sequence.

22. The system of claim 20, wherein, if said SPR frame indicates that said destination station has data ready for transmission, said wireless communication unit is to communicate a grant frame, the grant frame from said source station to said destination station in response to said SPR frame.

23. The system of claim 20, wherein said data comprises data to be communicated according to a wireless serial extension (WSE) protocol, or a Bulk only Transport (BOT) protocol.

24. A system comprising:
at least one wireless communication device including:
one or more antennas; and
a wireless communication unit to perform the functionality of a first station to communicate data with a second station during an allocated time period, wherein one station of said first and second stations comprises a source station and another station of said first and second stations comprises a destination station, wherein, when data is not ready for transmission between said first and second stations, said wireless communication unit is to repeatedly communicate a null frame from said source station to said destination station until data is ready for transmission between said source station and said destination station or until the end of said allocated time period, the null frame including a quality of service (QoS) Null frame having a reverse direction grant (RDG) indicator bit set to a value configured to allow said destination station to transmit data.

25. The system of claim 24, wherein an inter-frame-space (IFS) between successive null frames is not longer than a short-inter-frame-space (SIFS).

26. The system of claim 24, wherein said allocated time period comprises a time period selected from the group consisting of a scheduled time period and a contention-based period.

27. An article including a non-transitory storage medium having stored thereon instructions that, when executed by a machine, result in performing a method by a source station or a destination station, the method comprising:
communicating data between said source station and said destination station during an allocated time period; and
when data is not ready for transmission between said source station and said destination station, communicating a polling sequence between said source station and said destination station to occupy said allocated time period until data is ready for transmission between said source station and said destination station or until an end of said allocated time period, the polling sequence including a poll frame from said source station to said destination station, and a service period request (SPR) frame from said destination station to said source station, the SPR frame in response to said poll frame.

28. The article of claim 27, wherein said instructions result in repeating the communicating of said polling sequence, if said SPR frame does not indicate that said destination station has data ready for transmission.

29. An article including a non-transitory storage medium having stored thereon instructions that, when executed by a machine, result in performing a method by a source station or a destination station, the method comprising:
communicating data between said source station and said destination station during an allocated time period; and
when data is not ready for transmission between said source station and said destination station, repeatedly communicating a null frame from said source station to said destination station to occupy said allocated time period until data is ready for transmission between said source station and said destination station or until an end of said allocated time period, the null frame including a quality of service (QoS) Null frame having a reverse direction grant (RDG) indicator bit set to a value configured to allow said destination station to transmit data.

30. The article of claim 29, wherein said data comprises data to be communicated according to a Bulk only Transport (BOT) protocol, or a wireless serial extension (WSE) protocol.

* * * * *